(12) United States Patent
Shim et al.

(10) Patent No.: US 11,550,136 B2
(45) Date of Patent: Jan. 10, 2023

(54) DEVICE AND METHOD FOR MEASURING CENTRAL LOCATION OF SINGLE MOLECULE USING STRUCTURED ILLUMINATION AND PHASE DETECTION

(71) Applicants: Korea University Research and Business Foundation, Seoul (KR); Institute for Basic Science, Daejeon (KR)

(72) Inventors: Sang Hee Shim, Seoul (KR); Ji Woong Kwon, Seoul (KR)

(73) Assignees: Korea University Research and Business Foundation, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 325 days.

(21) Appl. No.: 16/757,470

(22) PCT Filed: Oct. 16, 2018

(86) PCT No.: PCT/KR2018/012170
§ 371 (c)(1),
(2) Date: Apr. 20, 2020

(87) PCT Pub. No.: WO2019/078578
PCT Pub. Date: Apr. 25, 2019

(65) Prior Publication Data
US 2021/0191098 A1    Jun. 24, 2021

(30) Foreign Application Priority Data
Oct. 18, 2017   (KR) .................. 10-2017-0135008

(51) Int. Cl.
*G02B 21/00* (2006.01)
*G02B 21/08* (2006.01)
(Continued)

(52) U.S. Cl.
CPC ....... *G02B 21/082* (2013.01); *G02B 21/0076* (2013.01); *G02B 21/14* (2013.01); *G02B 21/361* (2013.01)

(58) Field of Classification Search
CPC .. G02B 21/082; G02B 21/0076; G02B 21/14; G02B 21/361; G02B 21/16;
(Continued)

(56) References Cited

U.S. PATENT DOCUMENTS

2010/0025567 A1\*  2/2010  Lueerssen ............ G02B 21/245
                                                                        359/383
2016/0054553 A1\*  2/2016  Pantazis ............. G02B 21/0076
                                                                        250/206
(Continued)

*Primary Examiner* — Mustak Choudhury
(74) *Attorney, Agent, or Firm* — NSIP Law

(57) ABSTRACT

According to the present disclosure, an optical signal emitted from a single molecule is received to measure a central location of the single molecule while changing a phase of a structured illumination having a periodic pattern to measure a phase of a pattern in which a fluorescence intensity is periodically changed in accordance with a distance between the pattern and the single molecule while displacing the periodic pattern by a specific interval to measure the central location of the single molecule, thereby improving an accuracy of the central location of the single molecule with low photons and as a result, the resolution of the image may be enhanced.

9 Claims, 5 Drawing Sheets

(51) Int. Cl.
*G02B 21/14* (2006.01)
*G02B 21/36* (2006.01)

(58) Field of Classification Search
CPC .............. G02B 21/0092; G02B 27/425; G01N 2021/6471; G01N 2021/6484; G01N 2201/067; G01N 21/6458
See application file for complete search history.

(56) References Cited

U.S. PATENT DOCUMENTS

2016/0124208 A1* 5/2016 Best ................... G02B 21/0076
359/363
2016/0305883 A1* 10/2016 Betzig ..................... G02B 21/16

* cited by examiner

[FIG. 1]
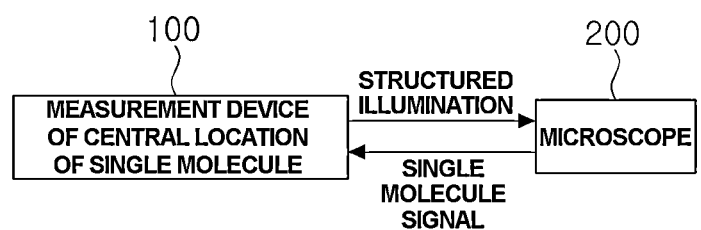
[FIG. 2]
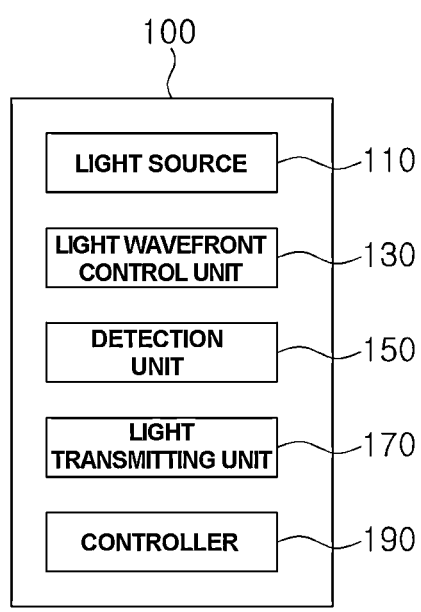

[FIG. 3]
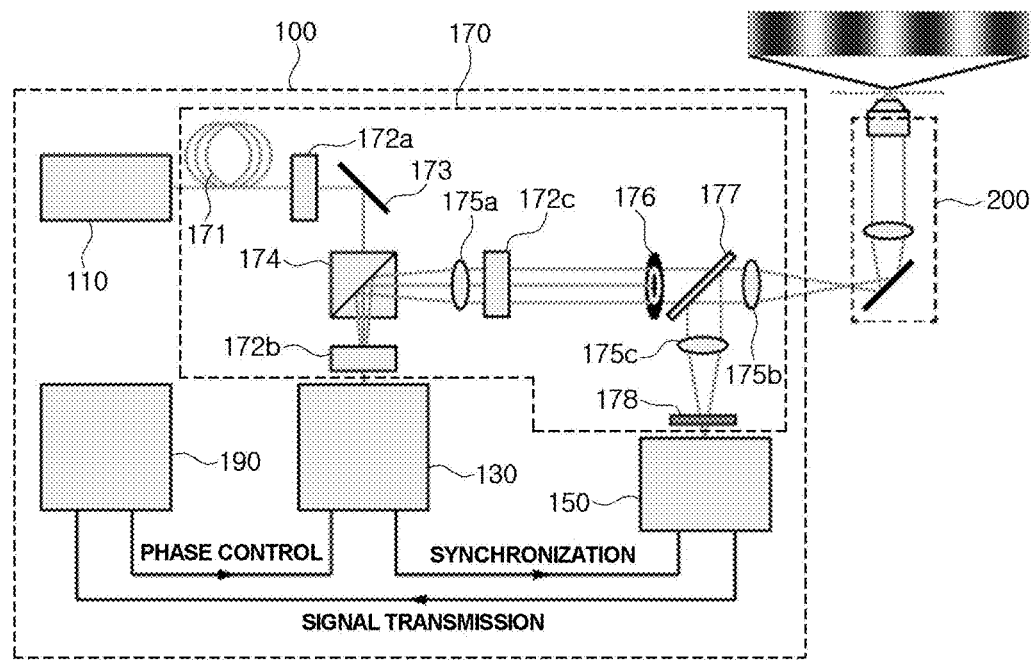
[FIG. 4]
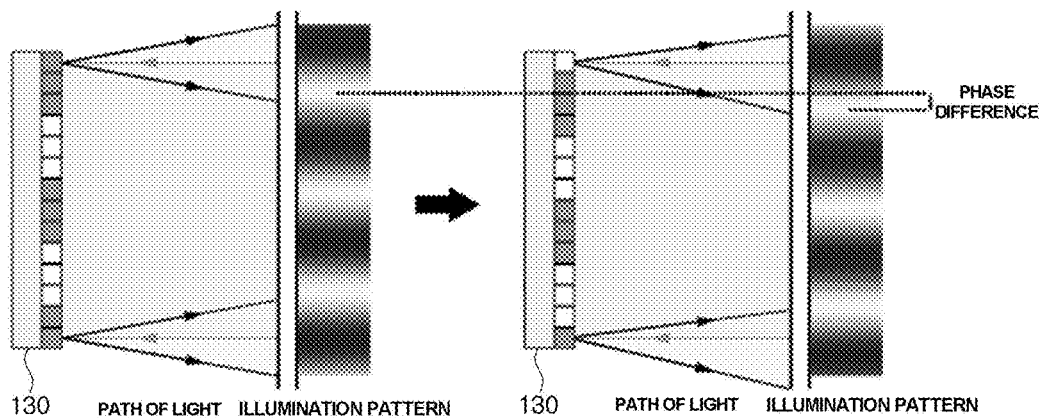

[FIG. 5]
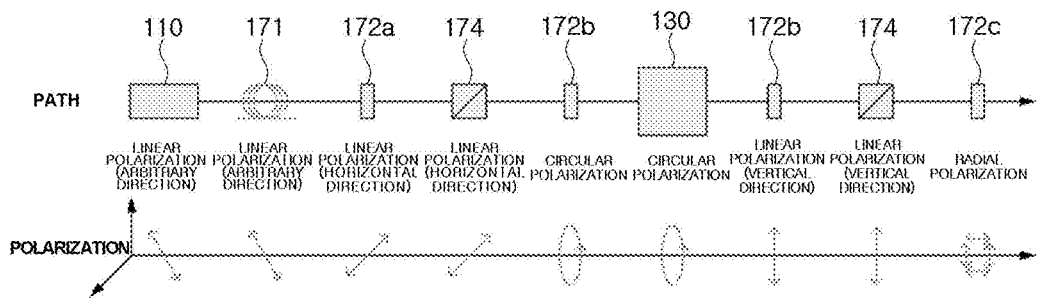
[FIG. 6]
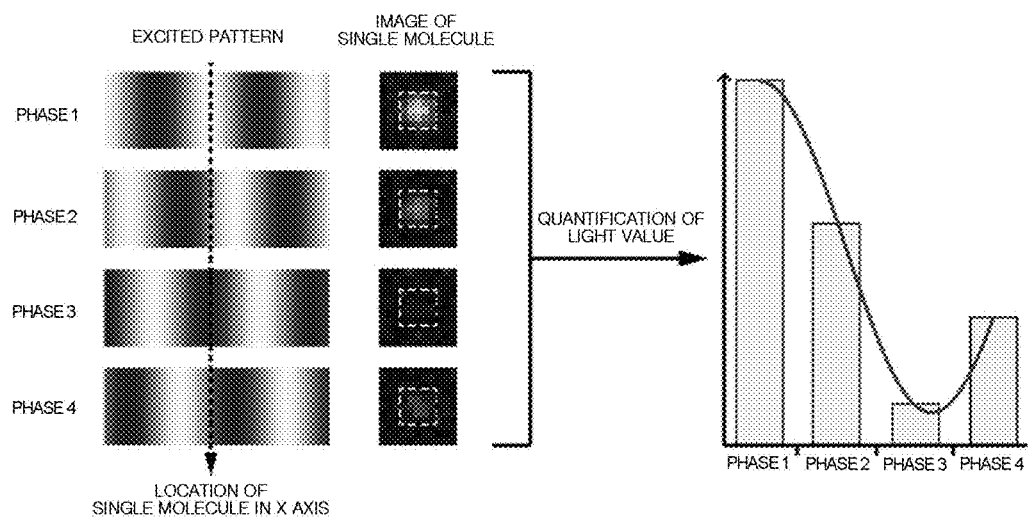

[FIG. 7]
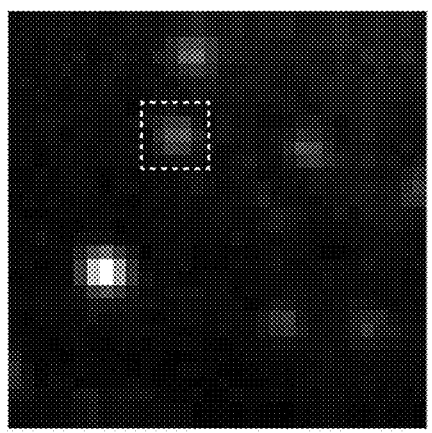
(a)
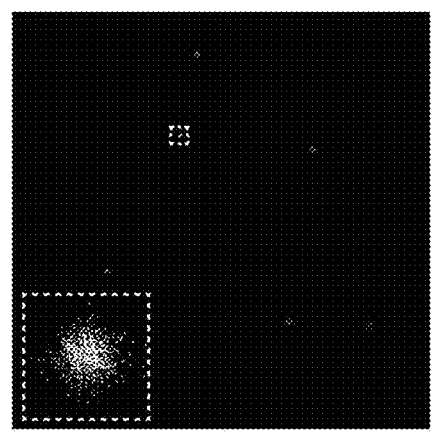
(b)
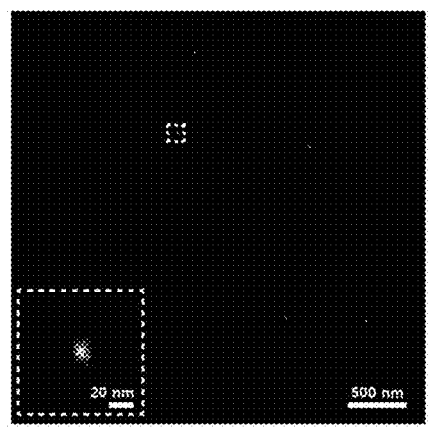
(c)
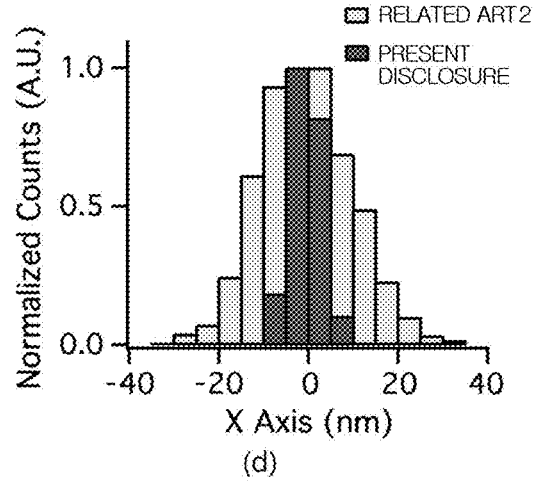
(d)

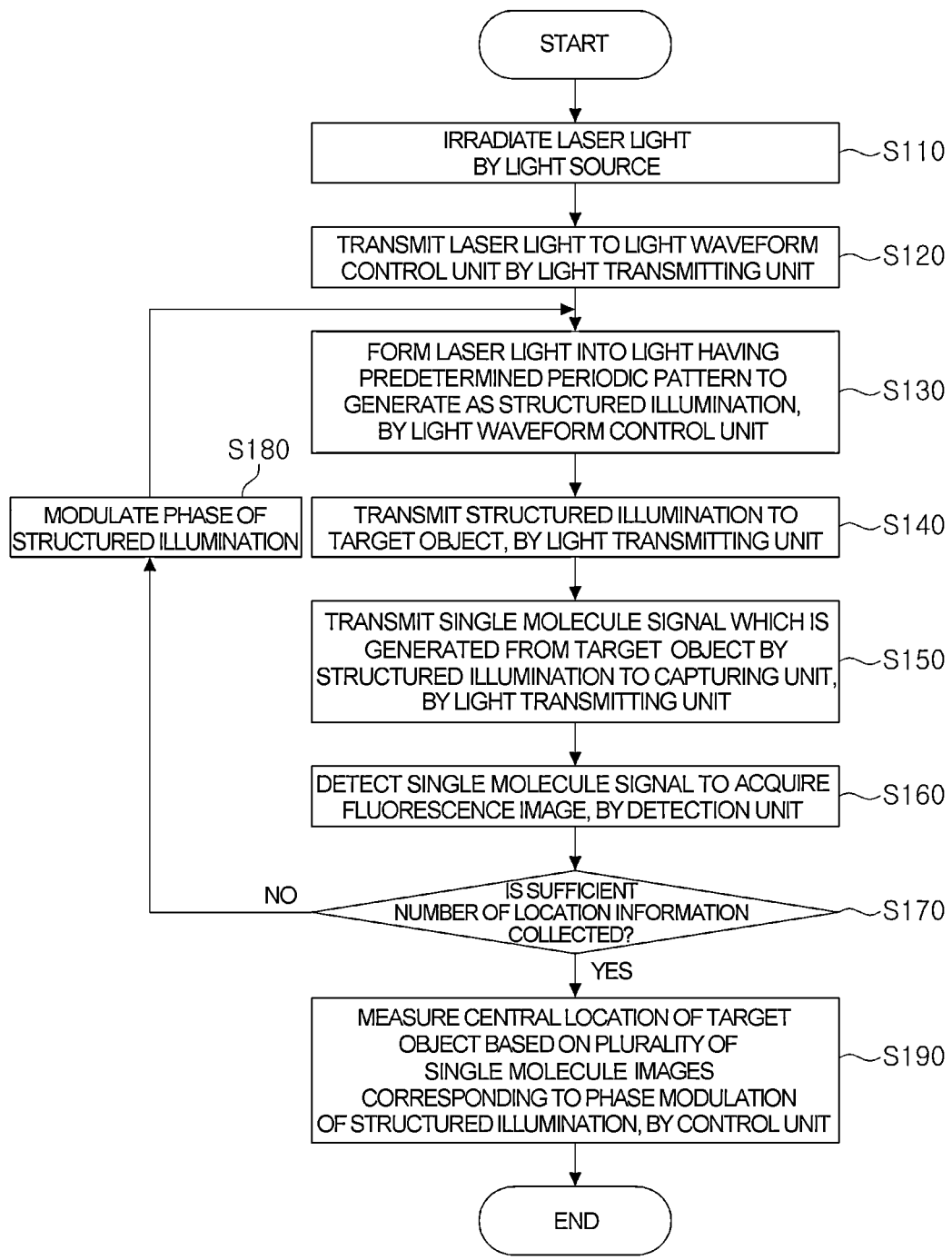

DEVICE AND METHOD FOR MEASURING CENTRAL LOCATION OF SINGLE MOLECULE USING STRUCTURED ILLUMINATION AND PHASE DETECTION

CROSS REFERENCE TO RELATED APPLICATIONS

This application is a U.S. National Stage Application of International Application No. PCT/KR2018/012170 filed on Oct. 16, 2018, which claims the benefit under 35 USC 119(a) and 365(b) of Korean Patent Application No. 10-2017-0135008 filed on Oct. 18, 2017, in the Korean Intellectual Property Office, the entire disclosure of which is incorporated herein by reference for all purposes.

TECHNICAL FIELD

The present disclosure relates to a device and method for measuring a central location of a single molecule using a structured illumination and phase detection, and more particularly, to a device and method for measuring a central location of a single molecule by forming laser light into a structured illumination having a periodic pattern and receiving an optical signal emitted from a single molecule while changing a phase of the structured illumination.

BACKGROUND ART

Various methods are currently being used to acquire a central location of a single molecule. Among them, the most widely used method is to measure a central location of a single molecule by approximating a pixelated two-dimensional image of the single molecule with a two-dimensional function (for example, a Gaussian or Airy function). According to this method, a central location value of a function which minimizes a difference between an image and the function is calculated by a non-linear regression or maximum likelihood estimation and an accuracy of several tens of nanometer is obtained for a general fluorescent molecule. However, according to this method, a limited number of photons is divided into a plurality of pixels to be measured so that the number of measurable photons is limited. Further, the accuracy of the location measurement is degraded due to the difference in sensitivity and noise between pixels.

According to another method which is recently reported (on 2017), the central location of the single molecule is measured using a fact that when the fluorescent molecules are excited using light formed to be a donut shape with a central intensity of 0, the fluorescence intensity varies depending on a distance between a center of light and a molecule. According to this method, an accuracy of several nanometers may be obtained even with a smaller number of photons as compared with the above-described method. However, this method has a drawback in that donut shaped light which is concentrated in an area of several hundred nanometers is used so that only the location of the molecules confined in a small area can be measured.

Accordingly, it is necessary to develop a technology of measuring central locations of molecules having an arbitrary distribution and structure with a higher accuracy.

DISCLOSURE

Technical Problem

A technical object to be achieved by the present disclosure is to provide a device and a method for measuring a central location of a single molecule using a structured illumination and phase detection which improve an accuracy of the measurement of the central location of the single molecule with low photons and conveniently measure locations of a molecules distributed in an arbitrary location with an arbitrary structure in a large area.

Technical Solution

In order to achieve the above-described technical objects, an exemplary embodiment of the present disclosure provides a measurement device of a central location of a single molecule using structured illumination and phase detection including: a light source configured to irradiate laser light; a light wavefront control unit configured to form the laser light irradiated by the light source into light having a predetermined periodic pattern to generate a structured illumination; a detection unit configured to detect single molecule signal which is generated from the target object to be generated by the structured illumination by the light wavefront control unit to acquire a single molecule image; and a controller configured to acquire a single molecule image corresponding to a structured illumination whose phase is modulated by the detection unit while modulating the phase of the structured illumination generated by the light wavefront control unit and measure a central location of the target object based on a plurality of acquired single molecule images.

The controller may detect a phase of a modulation pattern with a fluorescence emission intensity emitted from the target object, from the plurality of single molecule images, to measure the central location of the target object.

The measurement device may further include a light transmitting unit configured to transmit the laser light irradiated by the light source to the light wavefront control unit, transmit the structured illumination generated by the light wavefront control unit to the target object, and transmit the single molecule signal which is generated from the target object to be generated to the detection unit.

The light transmitting unit may include an optical fiber, a first polarization control plate, a mirror, a polarization light separator, a second polarization control plate, a first lens, a third polarization light control plate, a mask, a wavelength selection mirror, a second lens, a third lens, and a wavelength selection filter, transmit the laser light irradiated by the light source to the light wavefront control unit via the optical fiber, the first polarization control plate, the mirror, the polarization light separator, and the second polarization control plate, transmit the structured illumination generated by the light wavefront control unit to the target object via the second polarization control plate, the polarization light separator, the first lens, the third polarization control plate, the mask, the wavelength selection mirror, and the second lens, and transmit the single molecule signal which is excited to be generated from the target object to the detection unit via the second lens, the wavelength selection mirror, the third lens, and the wavelength selection filter.

The light transmitting unit may transmit the structured illumination generated by the light wavefront control unit to the target object through a microscope and receive the single molecule signal which is generated from the target object to be generated through the microscope.

The structured illumination may be light that is formed to have patterns with non-uniform light intensity which periodically repeat, such as stripes, lattice, and moire.

Another exemplary embodiment of the present disclosure provides a measurement method of a central location of a single molecule using structured illumination and phase detection which is a measurement method of a central location of a single molecule using a structured illumination and phase detection of a measurement device of a central location of a single molecule including a light source, a light wavefront control unit, a detection unit, and a controller including: irradiating laser light by the light source; forming the laser light irradiated by the light source into light having a predetermined periodic pattern to generate a structured illumination, by the light wavefront control unit; detecting single molecule signal which is generated from a target object to be generated by the structured illumination generated by the light wavefront control unit to acquire a single molecule image, by the detection unit; and acquiring a single molecule image corresponding to a structured illumination whose phase is modulated by the detection unit while modulating the phase of the structured illumination generated by the light wavefront control unit and measuring a central location of the target object based on a plurality of acquired single molecule images, by the controller.

The measuring of a central location may include detecting a phase of a modulation pattern with a fluorescence emission intensity emitted from the target object, from the plurality of single molecule images, to measure the central location of the target object, by the controller.

The measurement device of a central location of a single molecule may further include a light transmitting unit, the method may further include: transmitting the laser light irradiated by the light source to the light wavefront control unit, by the light transmitting unit; transmitting the structured illumination generated by the light wavefront control unit to the target object, by the light transmitting unit; and transmitting single molecule signal which is excited to be generated from the target object to the detection unit, by the light transmitting unit.

The light transmitting unit may include an optical fiber, a first polarization control plate, a mirror, a polarization light separator, a second polarization control plate, a first lens, a third polarization light control plate, a mask, a wavelength selection mirror, a second lens, a third lens, and a wavelength selection filter, the transmitting of the laser light includes: transmitting the laser light irradiated by the light source to the light wavefront control unit via the optical fiber, the first polarization control plate, the mirror, the polarization light separator, and the second polarization control plate, by the light transmitting unit, the transmitting of the structured illumination includes: transmitting the structured illumination generated by the light wavefront control unit to the target object via the second polarization control plate, the polarization light separator, the first lens, the third polarization control plate, the mask, the wavelength selection mirror, and the second lens, by the light transmitting unit, and the transmitting of single molecule signal includes: transmitting the single molecule signal which is excited to be generated from the target object to the detection unit via the second lens, the wavelength selection mirror, the third lens, and the wavelength selection filter, by the light transmitting unit.

The transmitting of the structured illumination includes: transmitting the structured illumination generated by the light wavefront control unit to the target object through a microscope, by the light transmitting unit, and the transmitting of single molecule signal includes: receiving the single molecule signal which is excited to be generated from the target object through the microscope, by the light transmitting unit.

The structured illumination may be light that is formed to have patterns with non-uniform light intensity which periodically repeat, such as stripes, lattice, and moire.

To achieve the aforementioned technical object, a computer program according to the present disclosure is stored in a computer-readable recording medium to execute any one of the aforementioned methods on a computer.

Advantageous Effects

According to the present disclosure, the device and method for measuring a central location of a single molecule using a structured illumination and phase detection may measure a phase of a pattern in which a fluorescent intensity is periodically changed in accordance with a distance between the pattern and the single molecule while moving the periodic pattern by a predetermined interval to measure the central location of the corresponding single molecule.

Further, all photons emitted from one single molecule are collected as one by a single detection unit to improve the accuracy of the central location of the single molecule with a low photon and thus a resolution of an image is also improved.

Further, generated light with a pattern which is repeated in a two-dimensional large area is used rather than concentrated light so that the location of the molecules distributed in an arbitrary location with an arbitrary structure may also be conveniently measured. That is, a periodic pattern is used and a location of the pattern is scanned as many as the cycle so than it is not limited to a specific area and applied to an arbitrary large area. In addition, ultra-high resolution optical imaging can be performed on a structure with an arbitrary size and an arbitrary shape with a resolution of several nanometers so that the resolution may be improved as compared with an ultra-high resolution optical microscope of the related art.

DESCRIPTION OF DRAWINGS

FIG. 1 is a block diagram for explaining a measurement device of a central location of a single molecule using a structured illumination and phase detection according to an exemplary embodiment of the present disclosure;

FIG. 2 is a block diagram for explaining a configuration of a measurement device of a central location of a single molecule illustrated in FIG. 1;

FIG. 3 is a view for explaining an example of a measurement device of a central location of a single molecule illustrated in FIG. 1;

FIG. 4 is a view for explaining an example of phase modulation of a structured illumination according to an exemplary embodiment of the present disclosure;

FIG. 5 is a view for explaining an example of polarization control according to an exemplary embodiment of the present disclosure;

FIG. 6 is a view for explaining an example of measurement of a central location of a single molecule according to an exemplary embodiment of the present disclosure;

FIG. 7 is a view for explaining a performance of measurement of a central location of a single molecule using a structured illumination and phase detection according to an exemplary embodiment of the present disclosure; and FIG. 8 is a flowchart for explaining a measurement method of a central location of a single molecule using a structured illumination and phase detection according to an exemplary embodiment of the present disclosure.

MODES OF THE INVENTION

An exemplary embodiment of a device and a method for measuring a central location of a single molecule using a structured illumination and phase detection according to the present disclosure will be described in detail with reference to the accompanying drawings.

First, a measurement device of a central location of a single molecule using a structured illumination and phase detection according to an exemplary embodiment of the present disclosure will be described with reference to FIG. 1.

FIG. 1 is a block diagram for explaining a measurement device of a central location of a single molecule using a structured illumination and phase detection according to an exemplary embodiment of the present disclosure.

Referring to FIG. 1, the measurement device of a central location of a single molecule using a structured illumination and phase detection according to an exemplary embodiment of the present disclosure (hereinafter, referred to as a measurement device) 100 forms laser light into a structured illumination having a periodic pattern. Further, the measurement device 100 transmits the structured illumination to a microscope 200. The microscope 200 irradiates the structured illumination on a target object (for example, a single molecule) and receives single molecule signal emitted from the target object to transmit the single molecule signal to the measurement device 100.

Further, the measurement device 100 receives the single molecule signal emitted from the target object (for example, a single molecule) by means of the microscope 200 while changing a phase of the structured illumination to measure a central location of the single molecule.

That is, the measurement device 100 excites the target object with the structured illumination which is formed with a pattern having a non-uniform light intensity, detects a phase of a modulation pattern with a fluorescent emission intensity emitted from the target object measured while modifying a location of the structured illumination to more accurately measure the central location of the corresponding target object.

In the meantime, even though it is illustrated that the measurement device 100 and the microscope 200 are independent devices from each other in FIG. 1, it is not limited thereto and the measurement device 100 and the microscope 200 may be implemented as one device depending on the embodiment. For example, the microscope 200 is implemented as one module in the measurement device 100 and the measurement device 100 directly irradiates the structured illumination onto the target object and directly receives the single molecule signal emitted from the target object.

Now, a measurement device of a central location of a single molecule using a structured illumination and phase detection according to an exemplary embodiment of the present disclosure will be described with reference to FIGS. 2 and 3.

FIG. 2 is a block diagram for explaining a configuration of a measurement device of a central location of a single molecule illustrated in FIG. 1 and FIG. 3 is a view for explaining an example of a measurement device of a central location of a single molecule illustrated in FIG. 1.

Referring to FIGS. 2 and 3, the measurement device 100 includes a light source 110, a light wavefront control unit 130, a detection unit 150, a light transmitting unit 170, and a controller 190.

The light source 110 irradiates laser light. That is, the light source 110 uses a laser light source as a light source. The laser light source has a characteristic as coherent light so that it is easy to create a pattern of the structured illumination according to the present disclosure. Further, the laser light source may prepare for an amount of light loss which may be generated in an optical device and component due to a large amount of light and ensure a sufficient amount of generated light for large area measurement. For example, the light source 110 may use a continuous oscillation laser light source or a pulsed laser light source as a light source.

The light wavefront control unit 130 forms the laser light irradiated by the light source 110 into light having a predetermined periodic pattern to generate a structured illumination. Here, the structured illumination refers to light that is formed to have patterns with non-uniform light intensity which periodically repeat, such as stripes, lattice, and moire.

That is, the light wavefront control unit 130 may change a phase of incident light to generate a structured illumination from the laser light. For example, the light wavefront control unit 130 includes a liquid crystal panel which is formed of pixels and generates the structured illumination having a predetermined periodic pattern by controlling the liquid crystal panel to change a phase of the incident light.

For example, the light wavefront control unit 130 may generate a structured illumination formed of a stripe pattern having a sine function shape from the laser light. Of course, the light wavefront control unit 130 may generate light having a periodic pattern, such as lattice pattern or moire, in addition to the stripe pattern, as a structured illumination. Hereinafter, under the assumption that the structured illumination has a stripe pattern, the following description will be made.

In order to generate a structured illumination having a stripe pattern, a light wavefront control unit 130 serves as a diffraction grating and reflects incident light into two paths from a macroscopic viewpoint. This will form a focus on a rear surface of an objective lens of the microscope 200 through the process of eliminating unnecessary light in the future, and as a result, form a stripe structure through the destructive/constructive interference at the focus of the objective lens.

Further, the light wavefront control unit 130 modulates a phase of the structured illumination in accordance with a phase control signal of the controller 190.

That is, the light wavefront control unit 130 adds a phase difference to the incident light by changing an alignment structure of the liquid crystal panel through a voltage to modulate a phase of the structured illumination. For example, the light wavefront control unit 130 may configure a liquid crystal alignment to have a specific period to give a phase difference of 0 or pi in order to serve as a diffraction grating. In this case, when the aligning order is changed while maintaining the cycle, a path of the reflected light is changed, which may cause a phase difference of the structured illumination formed at the focus of the objective lens of the microscope 200. The phase difference applied to the structured illumination may be determined in accordance with the cycle of liquid crystal set in the light wavefront control unit 130.

Further, the light wavefront control unit 130 operates by being synchronized with the detection unit 150. That is, when the detection unit 150 acquires one single molecule image, the light wavefront control unit 130 generates a structured illumination having a single phase and when the detection unit 150 acquires a next single molecule image, the light wavefront control unit 130 controls a liquid crystal alignment to generate a phase difference. For example, the light wavefront control unit 130 transmits a synchronization signal to the detection unit 150 to control the detection unit 150 to be synchronized with the phase modulation of the structured illumination of the light wavefront control unit 130 to acquire the single molecule image. It is also possible that the detection unit 150 transmits the synchronization signal to the light wavefront control unit 130 to synchronize the light wavefront control unit 130 and the detection unit 150 with each other.

Even though it has been described that the light wavefront control unit 130 includes a liquid crystal panel and changes the alignment structure of the liquid crystal panel by the voltage, it is not limited thereto. Depending on the embodiment, a phase plate or diffraction grating which is optimized for a specific structural illumination is used and the phase is adjusted by moving the phase plate or diffraction grating through a transmission gear moving light through a mirror scan. The detection unit 150 detects the single molecule signal which is excited to be generated from the target object by the structured illumination generated by the light wavefront control unit 130 to acquire the single molecule image.

The light transmitting unit 170 transmits the laser light, the structured illumination, and the single molecule signal to the light wavefront control unit 130, the photographing unit 150, and the microscope 200. To this end, the light transmitting unit 170 may include an optical fiber 171, a first polarization control plate 172a, a mirror 173, a polarization light separator 174, a second polarization control plate 172b, a first lens 175a, a third polarization light control plate 172c, a mask 176, a wavelength selection mirror 177, a second lens 175b, a third lens 175c, and a wavelength selection filter 178.

That is, the light transmitting unit 170 transmits the laser light irradiated by the light source 110 to the light wavefront control unit 130. The light transmitting unit 170 may transmit the laser light irradiated by the light source 110 to the light wavefront control unit 130 via the optical fiber 171, the first polarization control plate 172a, the mirror 173, the polarization light separator 174, and the second polarization control plate 172b.

Further, the light transmitting unit 170 transmits the structured illumination generated by the light wavefront control unit 130 to the target object through the microscope 200. The light transmitting unit 170 may transmit the structured illumination generated by the light wavefront control unit 130 to the target object through the microscope 200 via the second polarization control plate 172b, the polarization light separator 174, the first lens 175a, the third polarization control plate 172c, the mask 176, the wavelength selection mirror 177, and the second lens 175b.

Further, the light transmitting unit 170 receives the single molecule signal which is excited to be generated from the target object through the microscope 200 and transmits the single molecule signal to the detection unit 150. The light transmitting unit 170 receives the single molecule signal which is excited to be generated from the target object through the microscope 200 and may transmit the single molecule signal to the detection unit 150 via the second lens 175b, the wavelength selection mirror 177, the third lens 175c, and the wavelength selection filter 178.

Here, the optical fiber 171 may be a single mode optical fiber which makes a spatial pattern of the laser light to be a Gaussian pattern. Further, when a polarization maintaining optical fiber is used as the optical fiber 171, the polarization required for the structured illumination may be controlled while minimizing the amount of light loss. When the polarization maintaining optical fiber is not used, in order to create linear polarization after the optical fiber, a polarizer needs to be introduced and during this process, a large amount of light loss may be caused. The optical fiber 171 may be replaced with a pin hole having a diameter of several micrometers. In the meantime, even though the optical fiber 171 or a pin hole has been used to make the spatial pattern of the light source with a Gaussian pattern by assuming the general laser light source, when a light source whose oscillation shape is a Gaussian shape, such as an optical fiber laser, is used, the optical fiber 171 may not be used.

In order to make an ideal structured illumination, polarization of the traveling light needs to be appropriately controlled. This process may be performed using polarization control plates 172a, 172b, and 172c and the polarization light separator 174. The first polarization control plate 172a uses a $\lambda/2$ plate and controls a direction of linear polarization. The second polarization control plate 172b uses a $\lambda/4$ plate and changes a linear polarization and circular polarization to each other. The third polarization control plate 172c uses a vortex retarder and may create radial polarization.

Further, the process of dividing the light using the diffractive grating includes a light path by various multi-order diffraction, as well as the light by the desired first order diffraction. When unnecessary light is not removed, this may involve the interference process ay the focus of the objective lens, which may distort the pattern of the structured illumination. In order to effectively remove the unnecessary light, the mask 176 is introduced on a Fourier plane of an optical system to physically block the remaining light other than the path by the first-order diffraction.

Further, the wavelength selection mirror 177 is an optical component which is widely used for a general fluorescence microscope and has a characteristic of reflecting light having a specific wavelength and allowing other light to pass through. The wavelength selection mirror 177 illustrated in FIG. 3 passes the laser light and reflects a wavelength corresponding to the single molecule signal, but the light transmitting unit 170 may be configured using a wavelength selection mirror having a contrary characteristic.

Further, the wavelength selection filter 178 is an optical component commonly used in a general fluorescence microscope and removes light corresponding to a wavelength other than the single molecule signal with high efficiency. The wavelength selection filter 178 is placed in front of the detection unit 150 and is used to measure only a desired signal and when a signal to be observed is not single molecule signal, the filter may be replaced with an appropriate filter.

Further, even though it is illustrated that the mask 176 is a circular mask in FIG. 3, it is not limited thereto. Depending on the embodiment, the shape of the mask 176 may vary in accordance with the pattern of the structured illumination and various shapes of masks such as a pinhole arrangement may be used.

The controller 190 acquires the single molecule image corresponding to the structured illumination whose phase is modulated through the detection unit 150 while modulating a phase of the structured illumination generated by the light wavefront control unit 130.

Further, the control unit 190 measures a central location of the target subject based on a plurality of acquired single molecule images.

In this case, the control unit 190 detects a phase of the modulated pattern of the single molecule signal emission intensity emitted from the target object from the plurality of single molecule images to measure the central location of the target object.

As described above, the phase-modulated structured illumination is irradiated onto the target object while modulating the phase of the structured illumination and the signals emitted from the target object in accordance with the structured illumination whose phase is modulated are collected to measure the central location of the target object so that the noise influence of the pixelated detection unit 150 is minimized. Further, the accuracy of the location tracking may be improved even with a small number of photons. Further, a structured illumination having a repeated pattern in a two-dimensional large area is used instead of the concentrated light so that locations of a molecules may be conveniently measured in a large size sample in which a molecules is distributed in a large area with arbitrary locations and structures.

Now, a measurement device of a central location of a single molecule using a structured illumination and phase detection according to an exemplary embodiment of the present disclosure will be described with reference to FIGS. 4 to 6.

FIG. 4 is a view for explaining an example of a phase modulation of a structured illumination according to an exemplary embodiment of the present disclosure.

Referring to FIG. 4, a liquid crystal alignment of the light wavefront control unit 130 has a period of six pixel units. In this case, up to three phase differences (each phase difference is 120 degrees) may be created. The light wavefront control unit 130 forms the laser light into the light with a predetermined periodic pattern as illustrated in a left side of FIG. 4 to generate a structured illumination and modulates a phase of the structured illumination in accordance with a phase control signal of the controller 190 as illustrated in a right side of FIG. 4.

FIG. 5 is a view for explaining an example of polarization control according to an exemplary embodiment of the present disclosure.

Referring to FIG. 5, the light from the light source 110 generally has a linear polarization and a direction thereof may vary depending on a direction that the light source is mounted. The linear polarization is maintained using the optical fiber 171 and then a direction of the linear polarization is adjusted using the first polarization control plate 172a in accordance with the experiment. The polarization light separator 174 passes horizontal polarization and reflects vertical polarization. In order to transmit the laser light to the light wavefront control unit 130, the vertical polarization is created using the first polarization control plate 172a and is changed into circular polarization by the second polarization control plate 172b after passing through the polarization light separator 174.

Light reflected from the light wavefront control unit 130 is changed into the linear polarization while passing through the second polarization control plate 172b and has vertical polarization due to an operation principle so that the light is reflected from the polarization light separator 174 to travel toward the microscope 200. Thereafter, when the light is changed into the radial polarization by the third polarization control plate 172c, light in an opposite direction with respect to the center has the linear polarization in the same direction. Therefore, when the interference occurs at the focus of the objective lens of the microscope 200, the interference may be caused with the highest efficiency so that an ideal structured illumination may be created.

FIG. 6 is a view for explaining an example of measurement of a central location of a single molecule according to an exemplary embodiment of the present disclosure.

A left drawing of FIG. 6 illustrates that a signal of a single molecule in a specific location is changed in accordance with a total of four phases. When a portion of the structured illumination with a highest light amount is located in the position of the single molecule, the signal of the single molecule is detected most strongly. When the light amount is gradually reduced by changing the phase of the structured illumination, the signal of the single molecule is also reduced in accordance with the light amount.

The signal is increased or reduced in accordance with a period of the structured illumination and the intensity of the signal is approximated with respect to a given phase difference and a periodic function of the structured illumination to estimate an accurate location of the single molecule. A location where the strongest signal is acquired is a location of the single molecule so that the location of the corresponding single molecule may be acquired by estimating a highest location with a modulated pattern phase of the emitted signal. In this case, information from a plurality of pixels during the process of reading an emitted signal is comprehensively processed so that variations in signal errors between pixels are canceled out, so that the location of the signal molecule may be tracked with a higher accuracy than that of the existing approach (for example, a method of tracking a location of a single molecule by Gaussian approximation).

Although the exemplary embodiment of the present disclosure has been described with respect to the one-dimensional position tracking, in order to acquire an image of an actual target object in one dimension, it is necessary to two-dimensionally track the location. The two-dimensional analysis may be performed by configuring the diffraction grating of the light wavefront control unit 130 to be perpendicular to the pattern used for the one-dimensional analysis and also adjusting the phase of the structured illumination to be vertically in accordance with the change of the pattern.

Now, a performance of measurement of a central location of a single molecule using a structured illumination and phase detection according to an exemplary embodiment of the present disclosure will be described with reference to FIG. 7.

FIG. 7 is a view for explaining a performance of measurement of a central location of a single molecule using a structured illumination and phase detection according to an exemplary embodiment of the present disclosure.

FIG. 7A is an image acquired by a related art 1, FIG. 7B is an image acquired by a related art 2, FIG. 7C is an image acquired by the present disclosure, and FIG. 7D is a graph for comparing accuracies of the related art 2 and the present disclosure.

Related Art

According to the related art 1, an image is acquired by a general optical microscope to which any of location tracking mechanism is not applied (a spatial resolution is restricted by a diffraction limit).

According to the related art 2, the central location of the single molecule is measured by approximating a pixelated two-dimensional image of the single molecule with a two-dimensional function. A plurality of images corresponding to the related art 1 is acquired and two-dimensional function approximating method is used for every image to track a center point and then reconstruct an image from the acquired center point locations.

Experiment Process

A sample (gold nano particle) was located on an optical microscope and a periodic structured illumination (a structured illumination with a stripe pattern) was irradiated onto the sample. Two types of vertical stripe patterns were used to two-dimensionally track the location and images in accordance with four phase changes were acquired to collect signals (scattered optical signals) from the single particle to track the location (a total of eight phase changes). Optical signals emitted from the single particle at each phase were added to be processed to minimize a camera noise and the optical signal change in accordance with the phase was approximated with a structured illumination function to track the location. The location information acquired as described above was reconstructed as images.

Experiment Result

When the image according to the present disclosure (see FIG. 7C) and images according to the related arts 1 and 2 (see FIGS. 7A and 7B) were compared, it was confirmed that the present disclosure provided a better spatial resolution than that of the related arts.

Further, referring to FIG. 7D, it was confirmed that the spatial resolution was improved by approximately 2.9 times as compared with the related art 2. FIG. 7D is a location distribution graph obtained by one-dimensionally projecting location information of particles (see FIGS. 7B and 7C) enlarged on the image.

In summary, it was confirmed that the present disclosure was one-dimensionally improved by approximately 2.9 times and two-dimensionally improved by approximately 8.9 times as compared with the related art 2.

Now, a measurement method of a central location of a single molecule using a structured illumination and phase detection according to an exemplary embodiment of the present disclosure will be described with reference to FIG. 8.

FIG. 8 is a flowchart for explaining a measurement method of a central location of a single molecule using a structured illumination and phase detection according to an exemplary embodiment of the present disclosure.

Referring to FIG. 8, a light source 110 irradiates laser light (S110).

Next, a light transmitting unit 170 transmits the laser light to a light wavefront control unit 130 (S120). That is, the light transmitting unit 170 may transmit the laser light irradiated by the light source 110 to the light wavefront control unit 130 via the optical fiber 171, the first polarization control plate 172a, the mirror 173, the polarization light separator 174, and the second polarization control plate 172b.

Then, the light wavefront control unit 130 forms the laser light to be light having a predetermined periodic pattern and generates the light as a structured illumination (S130). Here, the structured illumination refers to is light that is formed to have patterns with non-uniform light intensity which periodically repeat, such as stripes, lattice, and moire. That is, the light wavefront control unit 130 may change a phase of incident light to generate a structured illumination from the laser light.

Next, the light transmitting unit 170 transmits the structured illumination to the target object (S140). That is, the light transmitting unit 170 may transmit the structured illumination generated by the light wavefront control unit 130 to the target object through the microscope 200 via the second polarization control plate 172b, the polarization light separator 174, the first lens 175a, the third polarization control plate 172c, the mask 176, the wavelength selection mirror 177, and the second lens 175b.

Next, the light transmitting unit 170 transmits single molecule signal which is generated from the target object to be generated by the structured illumination to the detection unit 150 (S150). That is, the light transmitting unit 170 receives the single molecule signal which is excited to be generated from the target object through the microscope 200 and transmits the single molecule signal to the detection unit 150 via the second lens 175b, the wavelength selection mirror 177, the third lens 175c, and the wavelength selection filter 178.

Then, the detection unit 150 detects the single molecule signal to acquire a single molecule image (S160).

When a sufficient number of location information is not collected (No in S170), the controller 190 controls the light wavefront control unit 130 to modulate a phase of the structured illumination (S180). That is, the light wavefront control unit 130 modulates a phase of the structured illumination in accordance with a phase control signal of the controller 190. For example, the light wavefront control unit 130 adds a phase difference to the incident light by changing an alignment structure of the liquid crystal panel through a voltage to modulate a phase of the structured illumination. Next, steps S130, S140, S150, and S160 are performed.

In contrast, when the sufficient number of location information is collected (Yes in S170), the controller 190 measures a central location of the target object based on the plurality of single molecule images corresponding to the phase modulation of the structured illumination (S190). That is, the control unit 190 detects a phase of the modulated pattern of the single molecule signal emission intensity emitted from the target object from the plurality of single molecule images to measure the central location of the target object.

The present disclosure may also be implemented as computer-readable codes written on a computer-readable recording medium. The computer-readable recording medium includes all types of recording devices on which data may be recorded in a computer-readable manner. Examples of the computer readable recording medium include a ROM, a RAM, a CD-ROM, a magnetic tape, a floppy disk, and an optical data storage device.

Although the exemplary embodiment of the present disclosure has been described in detail above, the present disclosure is not limited to the specific exemplary embodiment of the present disclosure, and a person of ordinary skill in the art may variously modify and work the present disclosure without departing from the principals of the present disclosure defined in the claims, and the modification belongs to the scope of the claims.

EXPLANATION OF REFERENCE MARKS

100: Measurement device of central location of single molecule
110: Light source
130: Light wavefront control unit
150: Detection unit
170: Light transmitting unit
190: Controller
200: Microscope

The invention claimed is:

1. A measurement device for measuring a central location of a single molecule using structured illumination and phase detection, the measurement device comprising:
 a light source configured to irradiate laser light;
 a light wavefront controller configured to form the laser light irradiated by the light source into light having a predetermined periodic pattern to generate a structured illumination;
 a detector configured to detect single molecule signal, which is generated from the single molecule, to be generated by the structured illumination generated by the light wavefront controller to acquire a single molecule image;
 a controller configured to acquire a single molecule image corresponding to a structured illumination whose phase is modulated by the detector while modulating the phase of the structured illumination generated by the light wavefront controller and measure a central location of the single molecule based on a plurality of acquired single molecule images; and
 a light transmitter configured to transmit the laser light irradiated by the light source to the light wavefront controller, transmit the structured illumination generated by the light wavefront controller to the single molecule, and transmit the single molecule signal which is generated from the single molecule to be generated to the detector,
 wherein the light transmitter comprises an optical fiber, a first polarization control plate, a mirror, a polarization light separator, a second polarization control plate, a first lens, a third polarization light control plate, a mask, a wavelength selection mirror, a second lens, a third lens, and a wavelength selection filter, transmits the laser light irradiated by the light source to the light wavefront controller via the optical fiber, the first polarization control plate, the mirror, the polarization light separator, and the second polarization control plate, transmits the structured illumination generated by the light wavefront controller to the single molecule via the second polarization control plate, the polarization light separator, the first lens, the third polarization control plate, the mask, the wavelength selection mirror, and the second lens, and transmits the single molecule signal which is excited to be generated from the single molecule to the detector via the second lens, the wavelength selection mirror, the third lens, and the wavelength selection filter.

2. The measurement device according to claim 1, wherein the controller detects a phase of a modulation pattern with a fluorescence emission intensity emitted from the single molecule, from the plurality of single molecule images, to measure the central location of the single molecule.

3. The measurement device according to claim 1, wherein the light transmitter transmits the structured illumination generated by the light wavefront controller to the single molecule through a microscope and receives the single molecule signal which is generated from the single molecule to be generated through the microscope.

4. The measurement device according to claim 1, wherein the structured illumination is light that is formed to have patterns with non-uniform light intensity which periodically repeat, such as stripes, lattice, and moire.

5. A measurement method tracking of a central location of a single molecule using a structured illumination and phase detection using a measurement device comprising a light source, a light wavefront controller, a detector, a controller, and a light transmitter, the measurement method comprising:
 irradiating laser light by the light source;
 transmitting the laser light irradiated by the light source to the light wavefront controller, by the light transmitter;
 forming the laser light irradiated by the light source into light having a predetermined periodic pattern to generate a structured illumination, by the light wavefront controller;
 transmitting the structured illumination generated by the light wavefront controller to the single molecule, by the light transmitter;
 detecting single molecule signal, which is generated from the single molecule, to be generated by the structured illumination generated by the light wavefront controller to acquire a single molecule image, by the detector;
 transmitting single molecule signal which is excited to be generated from the single molecule to the detector, by the light transmitter; and
 acquiring a single molecule image corresponding to a structured illumination whose phase is modulated by the detector while modulating the phase of the structured illumination generated by the light wavefront controller and measuring a central location of the single molecule based on a plurality of acquired single molecule images, by the controller,
 wherein the light transmitter comprises an optical fiber, a first polarization control plate, a mirror, a polarization light separator, a second polarization control plate, a first lens, a third polarization light control plate, a mask, a wavelength selection mirror, a second lens, a third lens, and a wavelength selection filter,
 the transmitting of the laser light comprises: transmitting the laser light irradiated by the light source to the light wavefront controller via the optical fiber, the first polarization control plate, the mirror, the polarization light separator, and the second polarization control plate, by the light transmitter,
 the transmitting of the structured illumination comprises: transmitting the structured illumination generated by the light wavefront controller to the single molecule via the second polarization control plate, the polarization light separator, the first lens, the third polarization control plate, the mask, the wavelength selection mirror, and the second lens, by the light transmitter, and
 the transmitting of single molecule signal comprises: transmitting the single molecule signal which is excited to be generated from the single molecule to the detector via the second lens, the wavelength selection mirror, the third lens, and the wavelength selection filter, by the light transmitter.

6. The measurement method according to claim 5, wherein the measuring of a central location comprises:
 detecting a phase of a modulation pattern with a fluorescence emission intensity emitted from the single molecule, from the plurality of single molecule images, to measure the central location of the single molecule, by the controller.

7. The measurement method according to claim 5, wherein the transmitting of the structured illumination comprises: transmitting the structured illumination generated by the light wavefront controller to the single molecule through a microscope, by the light transmitter, and
 the transmitting of single molecule signal comprises: receiving the single molecule signal which is excited to be generated from the single molecule through the microscope, by the light transmitter.

8. The measurement method according to claim 5, wherein the structured illumination is light that is formed to have patterns with non-uniform light intensity which periodically repeat, such as stripes, lattice, and moire.

9. A computer program stored in a non-transitory computer readable recording medium to execute the measurement method of a central location of a single molecule using structured illumination and phase detection according to claim 5.

* * * * *